(12) United States Patent
Ueyoko et al.

(10) Patent No.: US 6,427,743 B1
(45) Date of Patent: Aug. 6, 2002

(54) PNEUMATIC TIRE

(75) Inventors: Kiyoshi Ueyoko, Kobe; Tsuneyuki Nakagawa, Shirakawa; Minoru Nishi, Kobe; Tomoyasu Shibata, Kakogawa; Kazumi Yamazaki, Osaka, all of (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/429,078

(22) Filed: Oct. 29, 1999

(30) Foreign Application Priority Data

| Oct. 29, 1998 | (JP) | ................................ | 10-308986 |
| Dec. 10, 1998 | (JP) | ................................ | 10-351841 |
| Oct. 5, 1999  | (JP) | ................................ | 11-283685 |

(51) Int. Cl.[7] .............................. B60C 15/00; B60C 9/00
(52) U.S. Cl. ..................... 152/552; 152/539; 152/547; 152/554; 152/555; 152/525
(58) Field of Search ................... 152/525, 552, 152/555, 539, 542, 549, 547, 546, 554

(56) References Cited

U.S. PATENT DOCUMENTS

| 3,495,645 | A | | 2/1970 | Gough | |
| 4,086,948 | A | * | 5/1978 | Suzuki | ............ 152/355 |
| 4,609,023 | A | * | 9/1986 | Loser | ............ 152/454 |
| 4,705,091 | A | * | 11/1987 | Iuchi | ............ 152/541 |
| 5,056,575 | A | * | 10/1991 | Yamaguchi | ............ 152/541 |
| 5,772,811 | A | * | 6/1998 | Ueyoko | ............ 152/540 |
| 5,824,170 | A | | 10/1998 | Weston et al. | |

FOREIGN PATENT DOCUMENTS

| EP | 0243558 | 11/1987 |
| EP | 0375443 | 6/1990 |
| EP | 0810106 A2 | 12/1997 |
| EP | 0810106 A3 | 6/1999 |
| JP | 550807 | 3/1993 |
| JP | 5178039 | 7/1993 |
| JP | 2724291 | 11/1997 |

OTHER PUBLICATIONS

Patent Abstracts of Japan, 05178039, Jul. 20, 1993, Matsuda Hideki.
Patent Abstracts of Japan, 05050807, Mar. 2, 1993, Oki Masahiko.

\* cited by examiner

*Primary Examiner*—Michael W. Ball
*Assistant Examiner*—Justin Fischer
(74) *Attorney, Agent, or Firm*—Birch, Stewart, Kolasch & Birch, LLP

(57) ABSTRACT

In a pneumatic tire, a cord spacing between an axially outer cord layer and an axially inner cord layer such as: a turnup portion and a main portion of a carcass ply; or a bead reinforcing cord layer and a carcass ply turnup portion, is increased from the radially inside to the outside of the tire to improve the durability of the bead portion.

5 Claims, 7 Drawing Sheets

PNEUMATIC TIRE

The present invention relates to a pneumatic tire having an improved bead structure capable of improving the durability.

In general, heavy duty tires for trucks, buses and the like are provided with big bead portions to withstand heavy loads.

In Japanese Patent 724291, however, in order to improve bead durability, a pneumatic tire having relatively small bead portions was proposed. In this proposition, the rubber on the axially inside of the carcass shown in FIG. 9 by broken line is reduced in the volume. And on the radially outside of a bead core (c), a turnup portion (d1) and main portion (d2) of a carcass ply adjoin each other to extend parallel with each other.

In order to further improve durability of this bead structure, the present inventors studied mechanism of possible bead damage, and it was found that a stress on the radially outer end (e) of the turnup portion (d1) increases as it approaches the maximum tire section width position, and the stress is liable to cause small cracks (initial cracks) around the outer end (e), and the small cracks grow radially inwards through between the turnup portion (d1) and main portion (d2) to cause separation failure.

It is therefore, an object of the present invention to provide a pneumatic tire, especially a heavy duty radial tire, in which the above-mentioned small cracks around the radially outer ends of the carcass ply turnup portions are prevented.

According to the present invention, a pneumatic tire comprises a tread portion, a pair of sidewall portions, a pair of bead portions each with a bead core therein, and at least one pair of an axially outer cord layer and an axially inner cord layer each extending radially outwardly from each bead portion, wherein the axially outer cord layer is terminated at a radial height not more than 50% of the section height of the tire, and the axially inner cord layer extends radially outwardly beyond the radially outer end of the axially outer cord layer, and a cord spacing between the axially outer cord layer and the axially inner cord layer decreases radially inwardly from the radially outer end of the axially outer cord layer.

Embodiments of the present invention will now be described in detail in conjunction with the accompanying drawings.

Figure 1:
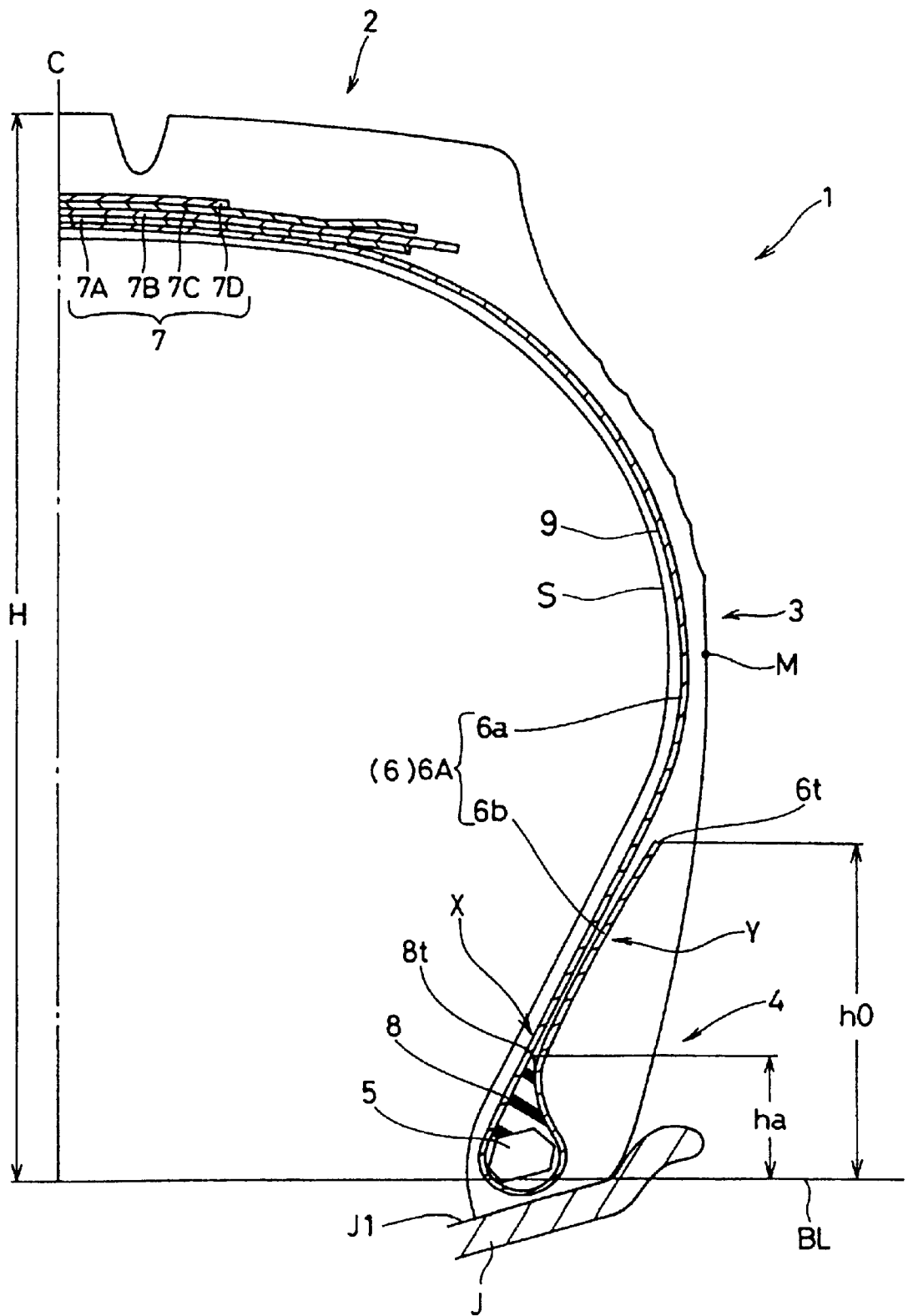
FIG. 1 is a cross sectional view of a pneumatic tire according to the present invention showing a basic tire structure.

In the drawings, tire 1 according to the present invention is a radial tire for trucks and buses.

The tire 1 comprises a tread portion 2, a pair of sidewall portions 3, a pair of bead portions 4 each with a bead core 5 therein, a carcass 6 extending between the bead portions 4, and a belt disposed radially outside the carcass 6 in the tread portion 2.

The carcass 6 comprises at least one ply 6A of rubberized cords 6c arranged radially at an angle of from 70 to 90 degrees with respect to with respect to the tire equator C, and extending between the bead portions 4 through the tread portion 2 and sidewall portions 3, and turned up around the bead core 5 in each bead portion from the axially inside to the outside of the tire to form a pair of turnup portions 6b and a main portion 6a therebetween. For the carcass cords 6c, steel cords or organic fiber cords, e.g. nylon, rayon, polyester, aromatic polyamide and the like can be used. In the example shown in FIG. 1, the carcass 6 is composed of a single ply 6A of steel cords arranged at substantially 90 degrees. The carcass profile is designed to minimize its change from the non-inflated condition to the inflated condition, and the carcass ply turnup portion is disposed adjacently to the main portion to decrease stress at the carcass ply turnup end.

Preferably, the topping rubber 6g for the carcass cords 6c has a 100% modulus of from 37 to 47 kgf/sq.cm (3628 to 4610 kPa).

The belt comprises a breaker 7 and optionally a band (not shown).

The breaker 7 comprises at least two cross plies of parallel cords. For the breaker cords, steel cords or organic cords, e.g. rayon, nylon, aromatic polyamide, nylon and the like can be used.

In FIG. 1, the breaker 7 is composed of four plies: a radially innermost first ply 7A of steel cords laid at an angle of from 50 to 70 degrees with respect to the tire equator C, and second, third and fourth plies 7B, 7C and 7D each of steel cords laid at an angle of not more than 30 degrees with respect to the tire equator C.

The bead core 5 is a coil of a steel wire 5w, and the outer surface thereof is covered with a thin wrapping rubber. Apart from steel wire, organic material such as aromatic polyamide cords may be used in the bead core 5.

In FIG. 1, the bead core 5 is formed into a hexagonal cross sectional shape, and a radially inner side 5i thereof inclines almost parallel with the bead base so that the radially inner side 5i inclines at an inclination angle almost same as the bead seat J1 of a standard rim J, that is, about 15 degrees with respect to the tire axial direction.

Here, the standard rim is the "standard rim" specified in JATMA, the "Measuring Rim" in ETRTO, the "Design Rim" in TRA or the like. In this case, therefore, the standard rim J is a 15-degree-taper center-drop rim. Besides, the standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

If not specifically mentioned, the heights referred hereafter mean a radial height measured radially from the bead base line BL under a state in which the tire is mounted on a standard rim and inflated to a standard presser but loaded with no tire load. The tire section height H is a radial height from the bead base line BL to the tire radially outermost point of the tire. The bead base line BL is a tire axial line extending at a radial position corresponding to the diameter of the standard rim.

Each of the bead portions 4 is provided between the carcass ply turnup portion 6b and main portion 6a with a rubber bead apex 8, the bead apex 8 extending radially outwardly from the bead core 5 and tapering towards its radially outer end. The height (ha) of the outer end 8t of the bead apex 8 is 6 to 31%, preferably 8 to 22%, more preferably 8 to 14% of the tire section height H. (in this embodiment about 11%) The bead apex 8 has an axially outer surface which is curved concavely. But, the an axially inner surface thereof is substantially straight and inclines substantially parallel with the carcass main portion 6a. The bead apex preferably has a JIS-A-hardness of from 60 to 99 degrees, and a 100% modulus of from 14 to 120 kgf/sq.cm (1372 to 11768 kPa).

The radially outer end 6t of the turnup portion 6b is positioned radially outward of the radially outer end 8t of the bead apex 8, but radially inwards of the maximum tire section width point M. The height (h0) of the outer end 6t is in the range of from 15 to 50%, preferably 20 to 40% of the tire section height H. (in this embodiment about 32%)

The cord spacing (t) between the carcass cords 6c in the turnup portion 6b and those in the main portion 6a decreases from the bead core 5 towards the outer end 8t of the bead apex 8, and the cord spacing (t) becomes a minimum value (tmin) near the outer end 8t.

The minimum value (tmin) is set in the range of from 0.15 to 7.0 times preferably 0.15 to 5.0 times, more preferably 0.15 to 4.5 times, still more preferably 0.5 to 3.5 times, more preferably 0.8 to 2.5 times the diameter D of the carcass cords 6c.

A region X (hereinafter parallel region X) in which the cord spacing (t) is the minimum value (tmin) continues for a certain length. The parallel region X exists in a radial height range between 1.1 times and 1.5 times the height (ha) of the bead apex 8, at least partially. Preferably, the parallel region X extends over the whole of the range. In any case, it is possible that the parallel region X extends outside this range.

In the parallel region X, the ratio (tmin/h) between a height (h) and the cord spacing (t=tmin) at the height (h) is set in the range of from 0.01 to 0.07, preferably 0.02 to 0.05, wherein the units of the height and cord spacing are the same.

A region Y (hereinafter, variable region Y) in which the cord spacing (t) gradually increases from the minimum value (tmin) towards the radially outside is formed to extend radially outwardly from the radially outer end of the parallel region X. The variable region Y is formed in a radial height range between 0.4 times and 1.0 times the height (h0) of the turnup portion. This means that the variable region may extends from 0.4 to 1.0 times h0, or from 0.5 to 1.0 times h0, or from 0.8 to 1.0 times h0, for example. Preferably, the variable region Y extends to the radially outer end 6t of the turnup portion 6b. In other words, the gradual increase of the cord spacing (t) continues to the radially outer end 6t as shown in FIG. 1. However, it may be possible that the variation of the cord spacing in the variable region Y decreases near the radially outer end 6t of the turnup portion 6b and as a result a substantially parallel region is formed.

To gradually increase the cord spacing (t), it is possible to employ: a linear increase—for example, the cord spacing (t) increases in proportion to the height (h) from the bead base line BL (thus t/h is substantially constant)—; and a non-linear increase—for example, the cord spacing (t) increases in proportion to the square of the height (h) (thus t/h^2 is substantially constant).

In case of a linear increase, the ratio (t/h) between a height (h) and the cord spacing (t) at the height (h) is set at a substantially constant value in the range of from 0.01 to 0.07, preferably 0.02 to 0.05, more preferably 0.03 to 0.05. If the ratio (t/h) is less than 0.01, it becomes difficult to control initial cracks at the outer end 6t. If the ratio (t/h) is more than 0.07, the rubber between the turnup portion 6b and main portion 6a is liable to deteriorate by heat due to sharing stress during running.

The cord spacing (t) reaches to a maximum value (tmax) at the radially outer end 6t of the turnup portion 6b. The maximum value (tmax) is set in the range of from 0.5 to 9.0 times, preferably 1.0 to 6.0 times, more preferably 1.5 to 4.5 times the diameter D of the carcass cords 6c, which is usually 1.3 to 3.0 times the minimum value (tmin).

By providing such variable region Y, initial cracks can be controlled near the turnup end 6t and near the bead apex end 8t and the durability of the bead portion 4 can be improved.

Figure 2:
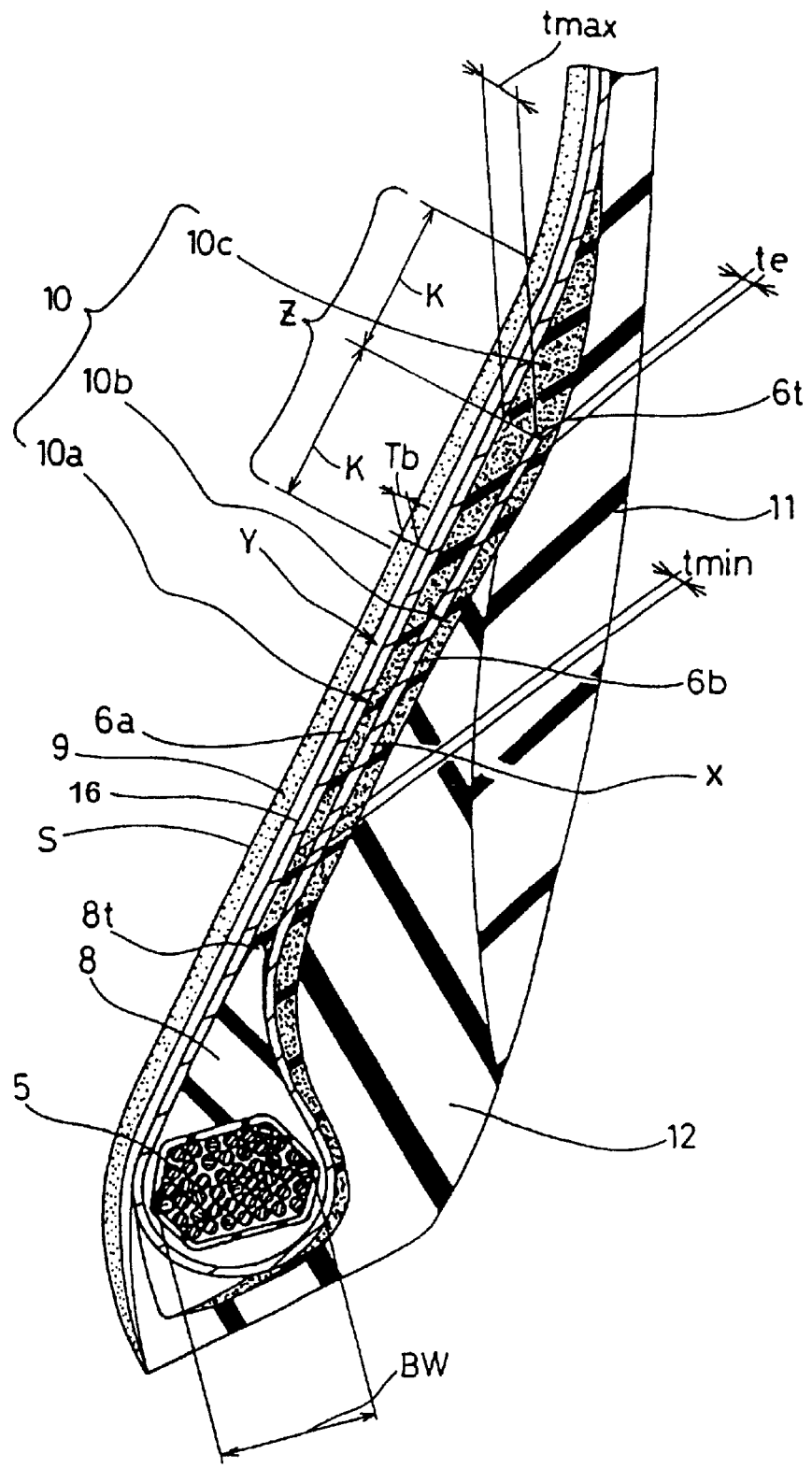
FIG. 2 is an enlarged cross sectional view of an example of the bead portion thereof showing an arrangement of various rubber components.
Figure 3:
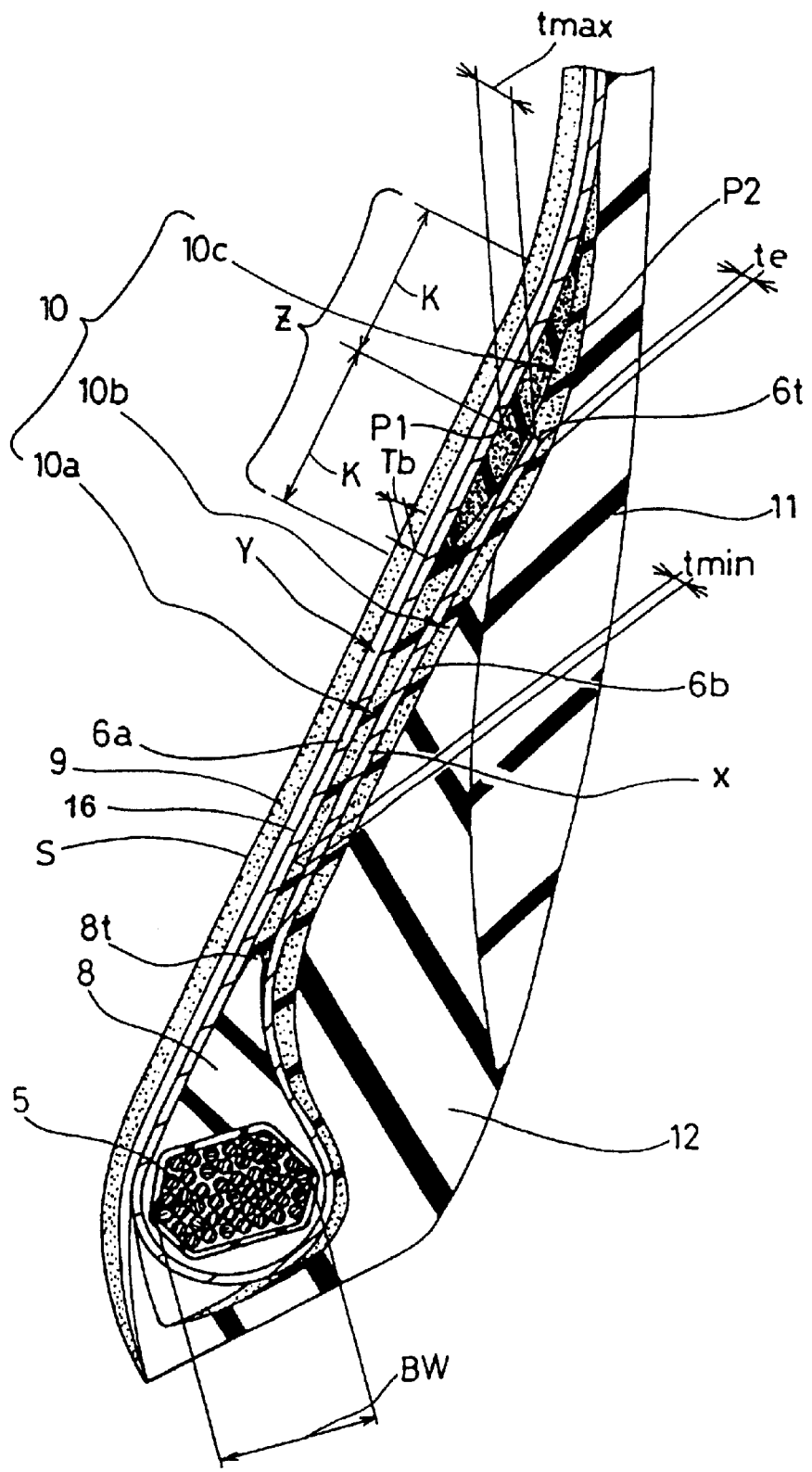
FIG. 3 is an enlarged cross sectional view showing another arrangement similar to that in FIG. 2.
Figure 5:
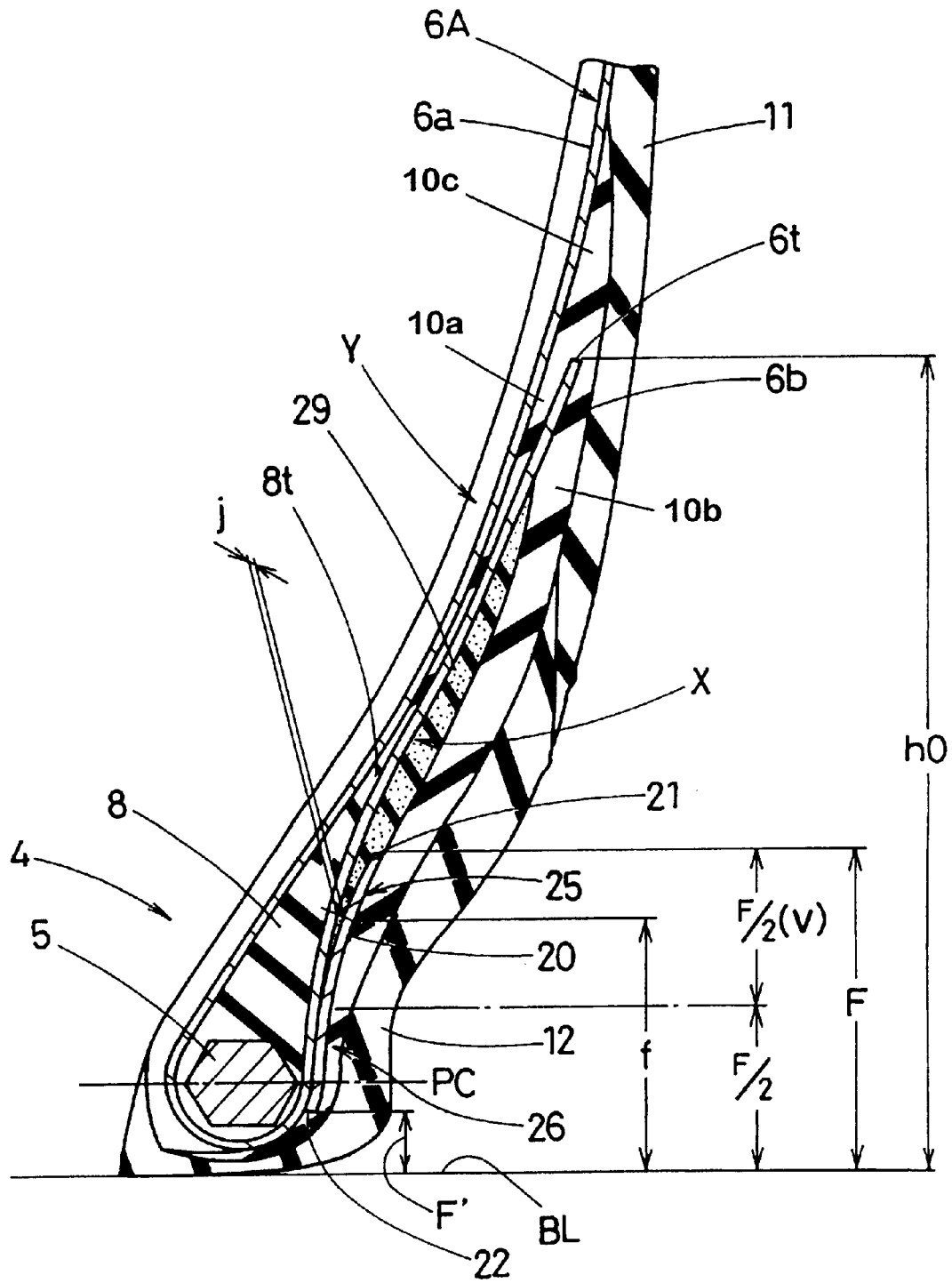
FIG. 5 is a cross sectional view showing another reinforcing cord layer combinable with the basic tire structure.

As shown in FIG. 2,3 and 5, the carcass ply turnup portion 6b is covered with an insulation rubber 10 made of a rubber compound different from a sidewall rubber 11 and a chafer rubber 12.

The insulation rubber 10 comprises an axially inner-part 10a disposed on the axially inside of the turnup portion 6b, an axially outer part 10b disposed on the axially outside of the turnup portion 6b, and a radially outer tapered part 10c.

The axially inner part 10a extends from the turnup end 6t to the bead apex end 8t to provide the above-mentioned cord spacing (t).

The axially outer part 10b has a substantially uniform thickness and extends from the turnup end 6t to a position radially inside the bead core 5. Preferably, the thickness (te) at the outer end 6t is set at at least 1 mm.

The radially outer tapered part 10c extends radially outwardly from the turnup end 6t to a radial position spaced apart from the turnup end 6t by a radial distance of at least 60 mm preferably at least 75 mm to improve the adhesion to the sidewall rubber 11.

The insulation rubber 10 has a 100% modulus of from 15 to 47 kgf/sq.cm (1470 to 4606 kPa).

On the axially outside of the insulation rubber 10, there are disposed the sidewall rubber 11 defining the outer surface of the sidewall portion 3, and a chafer rubber 12 spliced with the sidewall rubber 11 and defining a outer surface contacting with the wheel rim J. The sidewall rubber 11 has a 100% modulus of from 10 to 20 kgf/sq.cm (980 to 1961 kPa), and the chafer rubber 12 has a 100% modulus of from 55 to 71 kgf/sq.cm (5394 to 6963 kPa).

In FIG. 2, the insulation rubber 10 is made of one kind of rubber compound having a 100% modulus of from 37 to 47 kgf/sq.cm (3628 to 4610 kPa).

FIG. 3 shows another example of the insulation rubber 10 which is made of a packing rubber P1 having a 100% modulus of from 15 to 47 kgf/sq.cm (1470 to 4610 kPa) and an insulating rubber P2 having a 100% modulus which is higher than the packing rubber P1 and in the range of from 37 to 47 kgf/sq.cm (3628 to 4610 kPa). The packing rubber P1 is disposed axially inside the turnup end 6t and extends between the axially inner part 10a and radially outer tapered part 10c. The radial distance from the outer end 6t to the radially outer end or the radially inner end is at least 10 mm preferably at least 15 mm.

The insulating rubber P2 forms other than the packing rubber part P1, namely, as shown in FIG. 3, the whole of the axially outer part 10b, an axially outside portion of the tapered part 10c, and a major portion of the axially inner part 10d extending from its radially inner end.

The axially outer surface of the packing rubber P1 is covered with the insulating rubber P2 not to contact with the sidewall rubber 11.

Therefore, movements of the turnup end $6t$ can be suitably controlled by the relatively high modulus of the insulating rubber P2. The relatively low modulus of the packing rubber P2 can absorb movements of the insulating rubber P2 and turnup portion $6b$ as one. Thus, the insulation rubber 10 can insulate the outer end $6t$ from movements of the sidewall rubber 11 and make it possible to further increase the separation-preventing effect.

In case of a tubeless type, the tire 1 is further provided with an inner liner 9 which extends over the inner surface S of the tire.

The inner liner 9 is made of a butyl-rubber-base rubber compound which contains at least 60, preferably at least 90 parts by weight of halogenated butyl rubber with respect to 100 parts by weight of rubber material. For the rest, diene rubber such as butadiene rubber and styrene-butadiene rubber and natural rubber can be used. But, regular butyl rubber is preferably used because of its excellent airtightness and excellent adhesiveness to diene rubber used in the carcass topping rubber. Further, it prevents the halogenated butyl rubber from deteriorating or hardening by build-up heat during running. In addition to the rubber materials, the inner liner rubber is compounded from various additives: reinforcing agent such as carbon black; processing agent such as oil; retarder such as magnesia oxide, mercapto benzothiazyl disulfide (MBTS); accelerator such as hydrozincite; vulcanizing agent such as sulfur; and the like.

The following Table 1 shows examples of such compound.

TABLE 1

| Compound | 1 | 2 | 3 | 4 | 5 | 6 |
| --- | --- | --- | --- | --- | --- | --- |
| Rubber material (parts by weight) | | | | | | |
| Halogenated butyl | 65 | 80 | 90 | 100 | 70 | 95 |
| Regular butyl | 35 | 20 | 10 | 0 | 0 | 0 |
| Natural rubber | 0 | 0 | 0 | 0 | 30 | 5 |
| Additive (phr) | | | | | | |
| Carbon black | 60 | 60 | 60 | 60 | 60 | 60 |
| Process oil | 10 | 10 | 10 | 10 | 10 | 10 |
| Stearic acid | 2 | 2 | 2 | 2 | 2 | 2 |
| Magnesia oxide | 0.5 | 0.5 | 0.5 | 0.5 | 0.5 | 0.5 |
| MBTS | 1.5 | 1.5 | 1.5 | 1.5 | 1.5 | 1.5 |
| Hydrozincite | 3 | 3 | 3 | 3 | 3 | 3 |
| Sulfur | 0.5 | 0.5 | 0.5 | 0.5 | 0.5 | 0.5 |
| Air permeability at 80 deg. C. ($\times 10^{-9}$ cc-cm/sq · cm. sec · cmHg) | 0.61 | 0.60 | 0.60 | 0.60 | 1.00 | 0.65 |
| Rheometer test | | | | | | |
| Scorch time (min.) | 7.5 | 5.1 | 4.6 | 4.0 | | |
| 90% flow time (min.) | 126.0 | 110.3 | 100.1 | 86.5 | | |
| Maximum torque (pound · inch) | 24.4 | 26.5 | 28.3 | 30.1 | | |
| Adhesiveness to carcass (kgf/cm) | 7.0 | 7.8 | 8.3 | 8.2 | | |

The inner liner 9 has a 100% modulus in the rage of from 5 to 20 kgf/sq.cm (490 to 1960 kPa).

Usually, the thickness Tb of the inner liner 9 is substantially constant from bead to bead. But, it is possible that a part in a specific region Z is thicker than the rest. This region Z is defined as extending radially outwardly and inwardly from the carcass turnup end $6t$ along the main portion $6a$ by a distance K equal to the maximum section width BW of the bead core 5. At least in this region Z, the rubber thickness Tb is set in the range of from 1.0 to 4.5 times preferably 1.5 to 3.0 times the diameter D of the carcass cord $6c$.

As a result, decrease in the cord strength and adhesive strength with rubber due to permeated moisture in the tire can be prevented to effectively prevent the initial cracks.

If the thickness Tb is less than 1.0 times the diameter D, it is insufficient for preventing the moisture permeation, and the cord strength and adhesion with rubber decrease. Further, the initial cracks are liable to be promoted. If the thickness Tb is more than 4.5 times the diameter D, the steering stability is deteriorated, and the weight and material cost increase, and fuel consumption increases.

In the examples shown in FIGS. 2 and 3, in order to prevent undulations of the inner liner 9 during vulcanization and to further improve the adhesion between the inner liner 9 and the carcass 6, a rubber layer 16 is disposed between the inner liner 9 and carcass 6. The 100% modulus thereof is in the range of 27 to 45 kgf/sq.cm (2646 to 4410 kPa) and lower than the carcass cord topping rubber $6g$.

Figure 4:
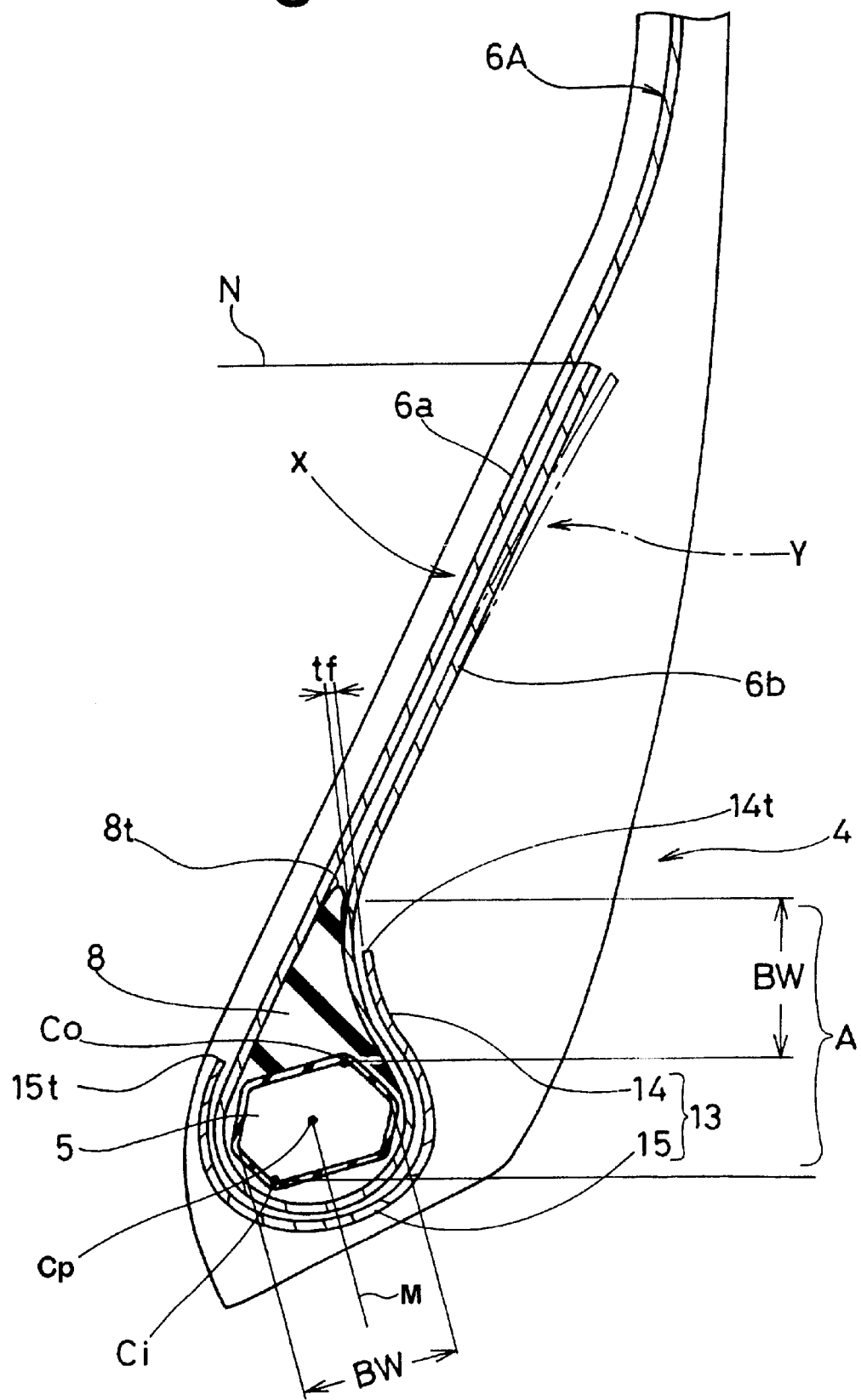
FIG. 4 is a cross sectional view showing a reinforcing cord layer combinable with the basic tire structure.

Further, in order to improve the bead portion in the resistance to chafing which is sometimes caused in the heavy duty tire, it is possible to provide the basic structures shown in FIGS. 1, 2 and 3 with a reinforcing cord layer 13 shown in FIG. 4.

The reinforcing cord layer 13 is composed of a single ply of reinforce cords laid at an angle in the range of from 30 to 90 degrees, preferable 30 to 60 degrees with respect to the circumferential direction of the tire.

In case of heavy duty tires, steel cords are preferably employed, but organic fiber cords, e.g. aromatic polyamide, aliphatic polyamide and the like can be employed.

The reinforcing cord layer 13 has a main part 14 disposed along the axially outer surface of the turnup portion $6b$, and an axially inwardly extending part 15 on the radially inside of the bead core. The radially outer end $14t$ of the main part 14 is disposed in a radial height range (A) between the radially innermost point Ci of the bead core 5 and a position which is radially outwardly spaced apart from the radially outermost point Co of the bead core 5 by a radial distance equal to the maximum section width BW of the bead core 5. The axially inwardly extending part 15 is ended in a range between a straight line M and an axial line N. The straight line M is drawn from the center of gravity Cp of the bead core 5 on its cross sectional shape toward the radially inside of the bead core 5 normally to the direction of the maximum section width of the bead core 5, which direction is almost parallel with the bead bottom face. The axial line N is drawn axially inwardly from the outer end $6t$ of the turnup portion $6b$. Thus, the axially inwardly extending part 15 can be made higher than the main part 14 contrary to the example shown. If the end $15t$ of the axially inwardly extending part 15 is positioned axial outside the line M or radially outside the line N, separation from the carcass ply tends to occur.

The cord spacing (tf) between the cords of the reinforcing cord layer 13 and the cords $6c$ of the carcass ply 6A is set in the range of from 0.15 to 4.5 times, preferably 0.5 to 3.5 times, more preferably 0.8 to 2.5 times the diameter D of the carcass cord $6c$ by disposing a rubber layer therebetween, If the cord spacing (tf) is less than 0.15 times the carcass cord diameter D, a separation failure is liable to occur between the reinforcing cord layer 13 and the carcass 6. If more than 4.5 times, as the thickness of the chafer rubber 12 under the bead core decreases, cord exposure and ply separation which greatly decrease the durability become liable to occur in the bead base, and further the tire becomes hard to be mounted on a wheel rim.

Incidentally, this reinforcing cord layer 13 can be used in combination with such a structure which is the substantially same as explained above but the variable region Y is omitted. Thus, only the parallel region X with the minimum cord spacing (tmin) is formed. In this case, the length of the parallel region X measured therealong is set in the range of from 0.5 to 5.0 times, preferably 1.0 to 4.0 times, more preferably 2.0 to 4.0 times the maximum section width BW of the bead core 5.

In a pneumatic tire of a tube type, the above-explained inner liner 9 may be omitted, without changing other components.

When a pneumatic tire is mounted on a wheel rim without a tube, a relatively high rim flange is usually employed. Accordingly, a large amount of frictional heat is generated during running because the bead portion rubs against the rim flange. The bead rubber is therefore liable to harden and deteriorate by the heat, and as a result, cracks are occurred on the surface of the bead portion. The cracks easily grow into the inside of the tire and cause a separation of the turnup portion from the surrounding rubber. This type of damage is called "chafing".

In case of a heavy duty tire of a tube type, it is preferable that the bead apex 8 is made of a relatively hard rubber in comparison with the tubeless type: and the ratio (t/h) is a substantially constant value of from 0.02 to 0.03. Further, in order to reinforce the bead portion and to improve the resistance to chafing which is sometimes caused in heavy duty tires of the tube type, it is preferable that each bead portion 4 is provided with a reinforcing cord layer 20 on the axially outside of the turnup portion 6b as shown in FIG. 5.

The reinforcing cord layer 20 is composed of a single ply of cords 20c (steel cords or organic fiber cords) laid at an angle of from 30 to 90 degrees, preferably 30 to 60 degrees with respect to the circumferential direction of the tire and rubberized with a topping rubber. The radially outer end 21 thereof is positioned at a height F in the range of from 0.15 to 1.0 times, preferably 0.15 to 0.80 times, more preferably 0.20 to 0.60 times, still more preferably 0.25 to 0.50 times the height h0 of the turnup portion 6b. The reinforcing cord layer 20 extends radially inwardly to the maximum section width line PC of the bead core at least. The maximum section width line PC is a straight line drawn along the direction of the maximum section width of the bead core 5 or a direction parallel to the bead seat of the wheel rim, passing the center of the bead core. If the outer end 21 is disposed at a position lower than 0.15 times the height h0, the bead-rigidity-increasing effect decreases, and it becomes difficult to control the chafing. If the outer end 21 is at position higher than 1.0 times the height h0, a large stress concentrates on the outer end 21 when the sidewall portion 3 is largely deformed and damages tend to occur in this part. If the inner end 22 of the reinforcing cord layer 20 does not extend to the line PC, it is difficult to fully reinforce a region in which chafing is liable to occur.

The cord spacing (j) between the reinforce cords 20c of the reinforcing cord layer 20 and the carcass cords 6c of the turnup portion 6b is set as follows. In a radial height range V between 50% and 100% of the height F of the reinforcing cord layer 20, the cord spacing (j) gradually increases towards the radially outside of the tire. (Hereinafter this region is called "second variable region 25.") The second variable region 25 extends at least 70%, preferably 100% of the region V. To gradually increase the cord spacing (j), a linear increase or non-linear increase explained in relation to the above-mentioned variable region Y can be used. Thus, for example, the ratio (j/f) between a height (f) and the cord spacing (j) at the height (f) is set at a substantially constant value in the range of from 0.01 to 0.13, preferably 0.01 to 0.10, more preferably 0.02 to 0.09. If the ratio (j/f) is less than 0.01, the rubber between the reinforcing cord layer 20 and turnup portion 6b is not provided with a necessary thickness, and initial cracks and destruction of rubber are liable to occur near the outer end 21 of the reinforcing cord layer 20. If the ratio (j/f) is more than 0.13, the thickness of rubber between the reinforcing cord layer 20 and turnup portion 6b excessively increased, and the outer end of the reinforcing cord layer 20 approaches to a region where a large compressive strain occurs and the chafing-preventing effect decreases.

Therefore, initial cracks between the reinforcing cord layer 20 and turnup portion 6b effectively prevented and the separation and chafing can be controlled over a long time.

A part of the reinforcing cord layer 20 extending radially inwardly from the radially inner end of the second variable region 25 is disposed adjacently to the carcass ply turnup portions 6b and in parallel thereto. (Hereinafter, second parallel region 26)

In FIG. 5, the second parallel region 26 extends to the radially inner end 22 of the reinforcing cord layer 20 which end is located axially outside the bead core 5. In this region 26, the ratio (j/f) is set in the range of from 0.01 to 0.08, more preferably 0.02 to 0.07.

Figure 6:
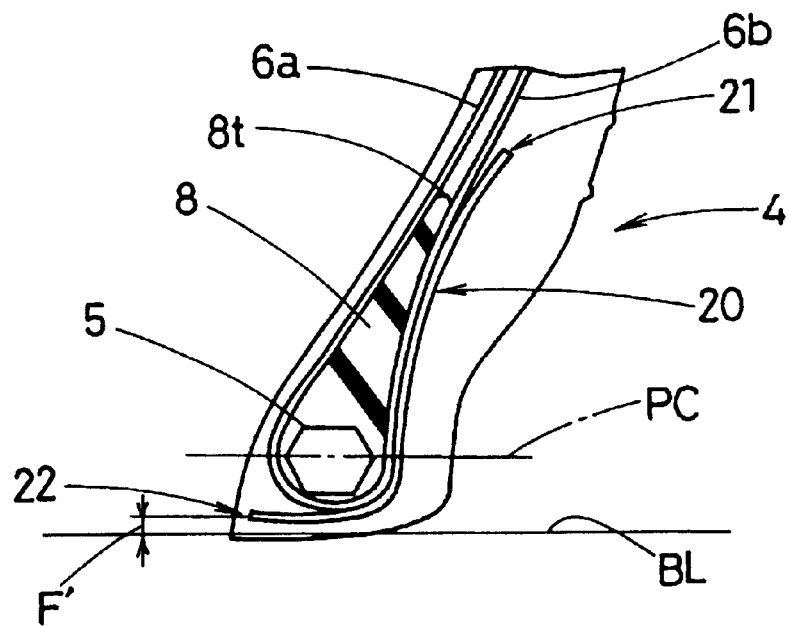
FIG. 6 and FIG. 7 are schematic cross sectional views showing modifications of the reinforcing cord layer shown in FIG. 5.
Figure 7:
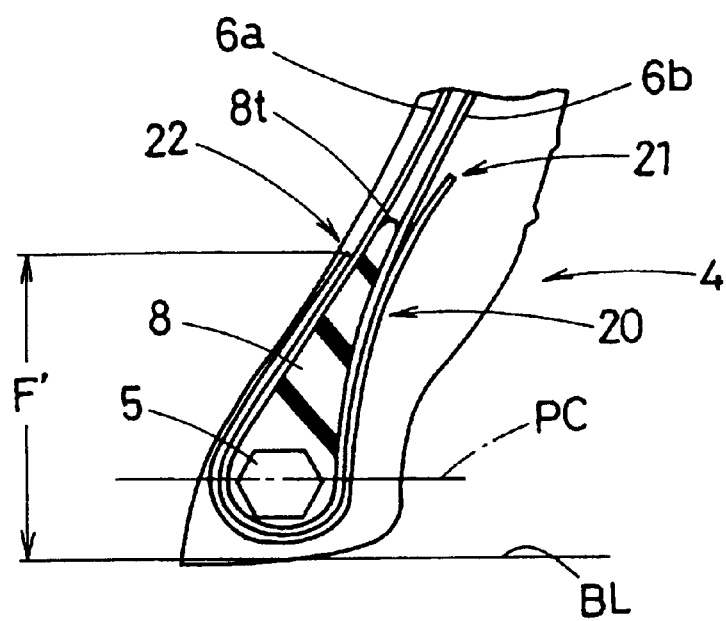

FIG. 6 and FIG. 7 show modifications of the reinforcing cord layer 20.

In FIG. 6, the radially inner end 22 of the reinforcing cord layer 20 is located at a position near the bead toe on the radially inside of the above-mentioned line PC and axially inside the bead core 5.

In FIG. 7, the reinforcing cord layer 20 is turned up around the bead core 5 towards the axially inside and the turner up portion extends radially outwardly along the axially inner surface of the carcass main portion 6a. In this case, it is preferable that the end 22 is positioned radially inward of the outer end 8t of the bead apex 8.

In the second variable region 25, an insulation rubber 29 is disposed between the reinforcing cord layer 20 and the carcass turnup portion 6b. And the insulation rubber 29 extends radially outwardly beyond the radially outer end 21. The insulation rubber 29 has a 100% modulus of from 14 to 65 kgf/sq.cm (1372 to 6374 kPa), preferably 20 to 50 kgf/sq.cm (1961 to 4903 kPa), more preferably 37 to 47 kgf/sq.cm (3628 to 4610 kPa).

The reinforcing cord layer 20 is combined with the above-mentioned carcass structure defining both the parallel region X and variable region Y as shown in FIGS. 1, 2, 3 and 5. It is however possible that the reinforcing cord layer 20 is combined with such a carcass structure that the variable region Y is omitted. Thus, only the parallel region X with the minimum cord spacing (tmin) is defined as shown in FIG. 4.

The reinforcing cord layer 20 (and also 13) is a single ply structure, and in the examples shown in the figures, no further cord layer is disposed along the outer surface of the reinforcing cord layer.

The present invention is suitably applied to heavy-duty tires such as truck/bus tires, but it may be applied to passenger-car tires, light-truck tires, motorcycle tires and the like.

Comparison Tests

Figure 8:
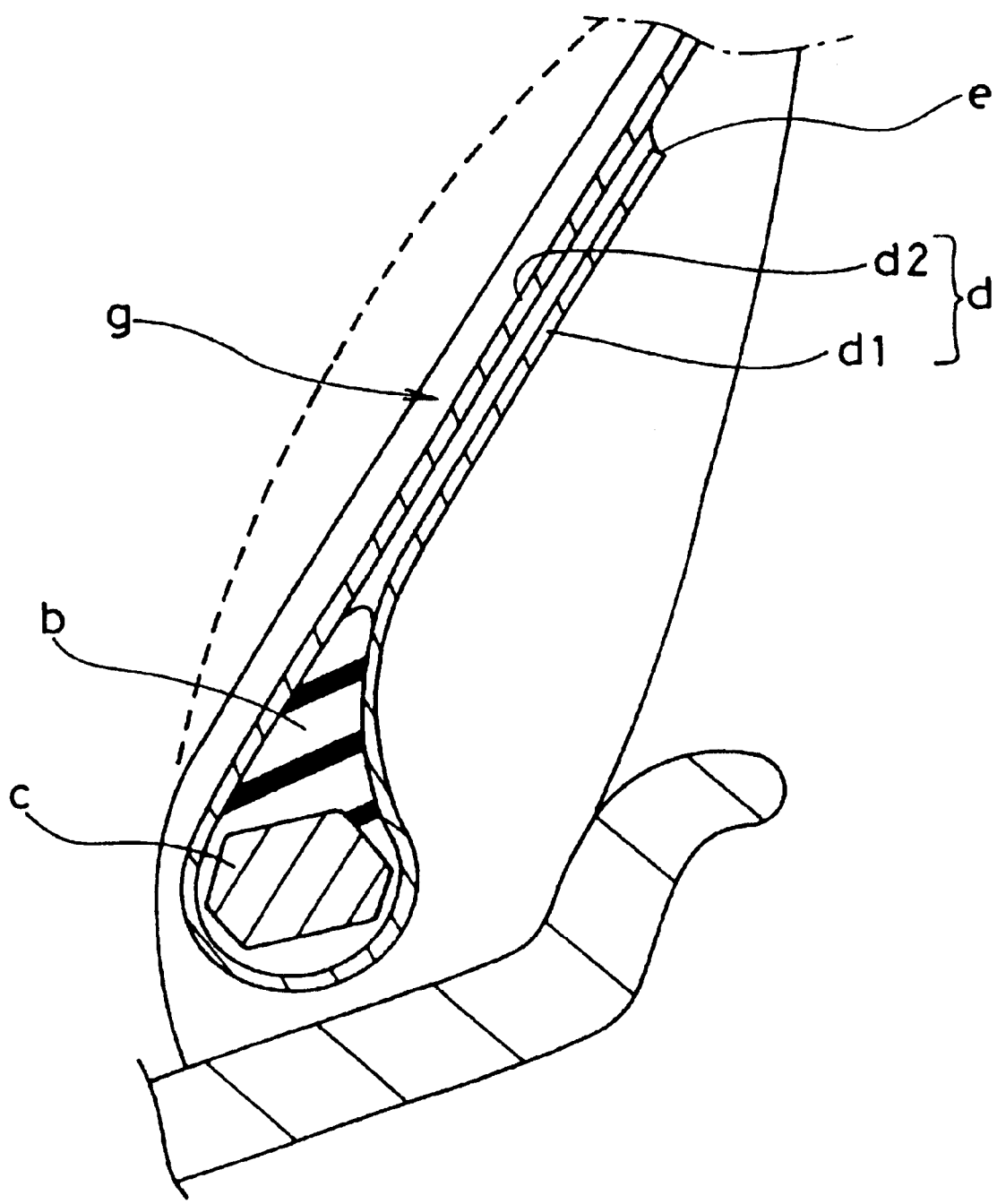
FIG. 8 is a cross sectional view showing a prior art.

Test tires having the basic structure shown in FIG. 1 were made and tested for durability to compare with the prior art tire shown in FIG. 8.

In the durability test, each test tire was run on a tire test drum until any visible damage occurred, and the running time was measured. The test results are shown in Table 2. The tire weights are also indicated in Table 2 using an index based on Prior art tire 1 being 100. The larger the value, the heavier the tire weight.

Further, test tires having the structure shown in FIG. 5 were made and tested for the durability and resistance to chafing.

Durability test: Same as above.

Chafing resistance test: When the running distance was reached to 8000 km in the drum durability test, the tire was checked for the number of cracks and the degree of deformation caused by chafing.

The test results are indicated in Table 3 using an index based. The larger the index, the better the performance.

| | |
|---|---|
| Test tire: | 11R22.5 14PR tubeless-type heavy-duty radial tire |
| Wheel rim size: | 8.25 × 22.5 |
| Tire pressure: | 1000 kPa |
| Speed: | 20 km/h |
| Load: | 9000 kgf |
| Max. running distance: | 10000 km |
| Carcass | |
| Number of ply | 1 |
| Cord | steel (3 × 0.17 + 7 × 0.20) diameter D = 0.9 mm |
| Cord count | 40/5 cm (under bead core) |
| Cord angle | 90 degrees to Tire equator |
| Topping rubber | 100% modulus = 42 kgf/sq · cm |
| Belt | |
| Number of ply | 4 |
| Cord | steel (3 × 0.20 + 6 × 0.35) |
| Cord count | 26/5 cm |
| Cord angle | +67, +18, −18, −18 dgrees to tire equator |
| Insulation rubber | 100% modulus = 41 kgf/sq · cm |

| | |
|---|---|
| Tire | 10.00R20 14PR tube-type heavy-duty radial tire |
| Wheel rim size | 7.50 × 20 |
| Carcass | |
| Number of ply | 1 |
| Cord | steel (3 × 0.2 + 7 × 0.23) diameter D = 0.9 mm |
| Cord count | 38/5 cm (under bead core) |
| Cord angle | 90 degrees to tire equator |
| Topping rubber | 100% modulus = 42 kgf/sq · cm |
| Belt | |
| Number of ply | 4 |
| Cord | steel (3 × 0.20 + 6 × 0.35) |
| Cord count | 26/5 cm |
| Cord angle | +67, +18, −18, −18 degrees to tire equator |
| Reinforcing cord layer | |
| Cord | steel (3 × 0.17 + 7 × 0.20 + WX0.15) |
| Cord count | 28/5 cm |
| Cord angle | 45 degrees to circumferential direction |

TABLE 2

| Tire | Prior. 1 | Ex. 1 | Ex. 2 | Ex. 3 | Ref. 1 | Ref. 2 | Ref. 3 | Ref. 4 | Ex. 4 |
|---|---|---|---|---|---|---|---|---|---|
| Turnup portion | | | | | | | | | |
| Height h0 (mm) | 70 | 70 | 70 | 70 | 70 | 70 | 70 | 70 | 70 |
| Cord spacing t | | | | | | | | | |
| tmax (mm) | 1.2 | 3.0 | 3.0 | 3.0 | 3.0 | 1.2 | 0.6 | 22 | 3.0 |
| tmin (mm) | 1.2 | 1.2 | 1.2 | 1.2 | 3.0 | 3.0 | 0.1 | 12 | 1.2 |
| tmin/D | 1.3 | 1.3 | 1.3 | 1.3 | 3.3 | 3.3 | 0.1 | 13.3 | 1.3 |
| Variable region | | | | | | | | | |
| t/h | — | 0.04 | 0.04 | 0.03–0.04 | — | — | 0.003–0.009 | 0.3 | 0.03–0.04 |
| Extending range (h/h0) | — | 0.38–1.0 | 0.42–1.0 | 0.57–1.0 | — | — | 0.57–1.0 | 0.57–1.0 | 0.57–1.0 |
| Parallel region | | | | | | | | | |
| Extending range (h/h0) | 0.43–1.0 | 0.36–0.38 | 0.39–0.42 | 0.43–0.57 | 0.43–1.0 | — | 0.43–0.57 | 0.43–0.57 | 0.43–0.57 |
| Extending range (h/ha) | 1.1–2.5 | 1.01–1.04 | 1.1–1.16 | 1.1–1.43 | 1.1–2.5 | — | 1.1–1.43 | 1.1–1.43 | 1.1–1.43 |
| Bead apex | | | | | | | | | |
| Height ha (mm) | 28 | 25 | 25 | 25 | 28 | 28 | 28 | 28 | 25 |
| ha/h0 | 0.40 | 0.35 | 0.35 | 0.35 | 0.4 | 0.4 | 0.4 | 0.4 | 0.35 |
| Insulation rubber 10 | | | | | | | | | |
| Height of tapere part (mm) | — | — | — | — | — | — | — | — | 96 |
| Thickness te (mm) | — | — | — | — | — | — | — | — | 1.5 |
| Durability | 100 | 103 | 108 | 110 | 97 | 60 | 70 | 90 | 150 |
| Tire weight | 100 | 100 | 100 | 100 | 102 | 105 | 95 | 120 | 100 |

TABLE 3

| Tire | Prior. 2 | Ex. 5 | Ex. 6 | Ex. 7 | Ex. 8 | Ex. 9 |
|---|---|---|---|---|---|---|
| Structure | FIG. 9 | FIG. 7 | FIG. 5 | FIG. 5 | FIG. 5 | FIG. 6 |
| Height h0 (mm) | 100 | 100 | 100 | 100 | 100 | 100 |
| Height ha (mm) | 50 | 50 | 50 | 50 | 50 | 50 |
| Height F (mm) | — | 40 | 40 | 33 | 101 | 40 |
| Height F' (mm) | — | 49 | 8 | 8 | 8 | 51 |
| Cord spacing t | | | | | | |
| tmax (mm) | 1.2 | 3.0 | 3.0 | 3.0 | 3.0 | 3.0 |
| tmin (mm) | 1.2 | 1.2 | 1.2 | 1.2 | 1.2 | 1.2 |
| tmin/D | 1.3 | 1.3 | 1.3 | 1.3 | 1.3 | 1.3 |
| Second Variable region | | | | | | |
| Extending range (× F) | | 0.5–1.0 | 0.5–1.0 | 0.5–1.0 | 0.5–1.0 | 0.5–1.0 |
| Cord spacing j | | | | | | |
| Variable range (mm) | — | 1–3.5 | 1–3.5 | 1–3.5 | 1–3.5 | 1–3.5 |
| Ratio (j/f) | | 0.05–0.09 | 0.05–0.09 | 0.05–0.09 | 0.05–0.09 | 0.05–0.09 |
| Durability | 100 | 108 | 110 | 106 | 90 | 110 |
| Chafing resistance | 100 | 170 | 170 | 130 | 170 | 170 |
| Tire weight | 100 | 110 | 103 | 101 | 110 | 104 |

Further, test tires having the structure shown in FIG. 2 were made and subjected to the above-mentioned drum durability test and a wet pressurizing test.

Wet pressurizing test was made as follows: First, a slash wound was made on the inner surface of the tire; the tire was mounted on a wheel rim; 200 cc water was injected thereinto; the tire is inflated with air to a standard pressure 1000 kPa; then the tire was run on a test drum under the same conditions as the above-mentioned durability test while injecting another 200 cc water every 100 hours; and the running time until any visible damage occurred was measured.

Further, the tires were subjected to a cut open inspection to check if the steel cords was rusted.

The results are indicated in Table 4 by an index based on Prior art tire 1 being 100. The larger the indedx, the better the durability.

| | |
|---|---|
| Test tire | 11R22.5 14PR tubeless-type heavy-duty radial tire |
| Wheel rim size | 8.25 × 22.5 |
| Carcass | |
| Number of ply | 1 |
| Cord | steel (3 × 0.2 + 7 × 0.23) Diameter D = 0.8 mm |
| Cord count | 36/5 cm (under the bead core) |
| Cord angle | 90 degrees to tire equator |
| Topping rubber | 100% modulus = 42 kgf/sq · cm |
| Belt | |
| Number of ply | 4 |
| Cord | steel (3 × 0.20 + 6 × 0.35) |
| Cord count | 26/5 cm |
| Cord angle | +67, +18, −18, −18 degrees to tire equator |
| Insulation rubber 10 | 100% modulus Ma = 41 kgf/sq · cm |

TABLE 4

| Tire | Ex. 12 | Ex. 13 | Ex. 14 | Ex. 15 | Ref. 5 | Ref. 6 | Ref. 7 | Prior. 1 |
|---|---|---|---|---|---|---|---|---|
| Inner liner | | | | | | | | |
| Halogenated butil (parts by weight) | 100 | 100 | 100 | 100 | 100 | 50 | 100 | 100 |
| Thickness Tb (mm) | 1.0 | 4.5 | 2.8 | 2.8 | 0.9 | 4.6 | 2.8 | 0.9 |
| Region Z extending range (outside/inside) | 4BW/4BW | 4BW/4BW | 4BW/4BW | 4BW/4BW | 4BW/4BW | 4BW/4BW | 0.9BW/0.9BW | 5BW/8BW |
| Carcass | | | | | | | | |
| Turnup portion | | | | | | | | |
| Height h0 (mm) | 70 | 70 | 70 | 70 | 70 | 70 | 70 | 70 |
| tmax (mm) | 3.0 | 3.0 | 3.0 | 3.0 | 3.0 | 3.0 | 3.0 | 1.2 |
| tmin (mm) | 1.2 | 1.2 | 1.2 | 1.2 | 1.2 | 1.2 | 1.2 | 1.2 |
| Variable region | | | | | | | | |
| Extending range (h/h0) | 57–100 | 57–100 | 57–100 | 57–100 | 57–100 | 57–100 | 57–100 | |
| Parallel region | | | | | | | | |
| Extending range (h/h0) | 43–56 | 43–56 | 43–56 | 43–56 | 43–56 | 43–56 | 43–56 | 43–100 |
| Extending range (h/ha) | 110–143 | 110–143 | 110–143 | 110–143 | 110–143 | 110–143 | 110–143 | 110–250 |

TABLE 4-continued

| Tire | Ex. 12 | Ex. 13 | Ex. 14 | Ex. 15 | Ref. 5 | Ref. 6 | Ref. 7 | Prior. 1 |
| --- | --- | --- | --- | --- | --- | --- | --- | --- |
| Bead Apex Height ha (mm) | 28 | 28 | 28 | 28 | 28 | 28 | 28 | 28 |
| Weight | 102 | 118 | 105 | 102 | 100 | 120 | 102 | 100 |
| Durability | 130 | 130 | 130 | 130 | 120 | 120 | 120 | 100 |
| Wet durability | 130 | 170 | 170 | 150 | 100 | 90 | 100 | 100 |
| Rust | none | none | none | none | present | present | present | present |

What is claimed is:

1. A pneumatic tire comprising:

a tread portion, a pair of sidewall portions, a pair of bead portions each with a bead core therein, a carcass ply made of cords extending between the bead portions and turned up around the bead cores from the axially inside to the outside of the tire to form a turnup portion in each said bead portion and a main portion there between, a bead apex disposed between said main portion and the turnup portion in each said bead portion and tapering radially outwardly from the bead core to its radially outer end, at least one pair of an axially outer cord layer and an axially inner cord layer each extending radially outwardly from each bead portion, said axially outer cord layer terminating at a radial height not more than 50% of the section height of the tire, said axially inner cord layer extending radially outwardly beyond the radially outer end of said axially outer cord layer, a cord spacing between said axially outer cord layer and said axially inner cord layer decreasing radially inwardly from the radially outer end of the axially outer cord layer so that a minimum value (tmin) thereof is in the range of from 0.15 to 7.0 times the diameter of the carcass cords, said axially outer cord layer being the turnup portion of the carcass ply, the turnup portion sandwiched between an axially inner insulation rubber and an axially outer insulation rubber, each of the axially inner insulation rubber and axially outer insulation rubber having a 100% modulus higher than that of a sidewall rubber disposed axially outside the axially outer insulation rubber, and the 100% modulus of the axially outer insulation rubber being higher than the 100% modulus of the axially inner insulation rubber.

2. The pneumatic tire according to claim 1, wherein said axially inner cord layer is said main portion of the carcass ply.

3. The pneumatic tire according to claim 2, wherein a region in which said cord spacing has said minimum value (tmin) is formed at least partially in a height range between 1.1 times and 1.5 times a height (ha) of the bead apex from the bead base line.

4. The pneumatic tire according to claim 1, wherein a region in which the ratio (t/h) of a height (h) from the bead base line and the cord spacing (t) thereat is a substantially constant value of from 0.01 to 0.07 is formed at least partially in a height range between 0.4 times and 1.0 times the height (h0) of the turnup portion from the bead base line.

5. The pneumatic tire according to claim 1, wherein each said bead portion is provided with a reinforcing cord layer disposed axially outside the turnup portion, the reinforcing cord layer extends radially outwards but ends between a radial position of the radially innermost point (Ci) of the bead core and a radial position radially outwardly spaced apart from the radially outermost point (Co) of the bead core by a distance equal to the maximum section width (BW) of the bead core, the reinforcing cord layer extends radially inwards and then axially inwards along the carcass ply but does not extend radially outwardly beyond the radially outer end of the turnup portion.

\* \* \* \* \*